US011257484B2

(12) United States Patent
Dimitriadis et al.

(10) Patent No.: US 11,257,484 B2
(45) Date of Patent: Feb. 22, 2022

(54) DATA-DRIVEN AND RULE-BASED SPEECH RECOGNITION OUTPUT ENHANCEMENT

(71) Applicant: Microsoft Technology Licensing, LLC, Redmond, WA (US)

(72) Inventors: Dimitrios Basile Dimitriadis, Bellevue, WA (US); Xie Chen, Bellevue, WA (US); Nanshan Zeng, Bellevue, WA (US); Yu Shi, Bellevue, WA (US); Liyang Lu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 16/546,715

(22) Filed: Aug. 21, 2019

(65) Prior Publication Data
US 2021/0056956 A1    Feb. 25, 2021

(51) Int. Cl.
*G10L 15/00* (2013.01)
*G10L 15/16* (2006.01)
*G06N 3/04* (2006.01)
*G06N 3/08* (2006.01)
*G10L 15/18* (2013.01)
*G10L 15/197* (2013.01)
*G10L 15/22* (2006.01)

(52) U.S. Cl.
CPC ............. *G10L 15/16* (2013.01); *G06N 3/04* (2013.01); *G06N 3/08* (2013.01); *G10L 15/1815* (2013.01); *G10L 15/197* (2013.01); *G10L 15/22* (2013.01); *G10L 2015/223* (2013.01)

(58) Field of Classification Search
None
See application file for complete search history.

(56) References Cited

U.S. PATENT DOCUMENTS 8,041,566 B2 * 10/2011 Peters ..................... G10L 15/32
704/236
8,494,853 B1 *  7/2013 Mengibar ............. G10L 15/065
704/235
8,543,401 B2 *  9/2013 Suendermann ..... G10L 15/1815
704/243

(Continued)

OTHER PUBLICATIONS

"International Search Report and Written Opinion Issued in PCT Application No. PCT/US20/037829", dated Sep. 9, 2020, 11 Pages.

*Primary Examiner* — Satwant K Singh
(74) *Attorney, Agent, or Firm* — Buckley, Maschoff & Talwalkar LLC

(57) ABSTRACT

According to some embodiments, a multi-layer speech recognition transcript post processing system may include a data-driven, statistical layer associated with a trained automatic speech recognition model that selects an initial transcript. A rule-based layer may receive the initial transcript from the data-driven, statistical layer and execute at least one pre-determined rule to generate a first modified transcript. A machine learning approach layer may receive the first modified transcript from the rule-based layer and perform a neural model inference to create a second modified transcript. A human editor layer may receive the second modified transcript from the machine learning approach layer along with an adjustment from at least one human editor. The adjustment may create, in some embodiments, a final transcript that may be used to fine-tune the data-driven, statistical layer.

19 Claims, 15 Drawing Sheets

(56) References Cited

U.S. PATENT DOCUMENTS

| | | | | |
|---|---|---|---|---|
| 10,019,984 B2* | 7/2018 | Kuo | ................... | G10L 15/183 |
| 2018/0342233 A1* | 11/2018 | Li | ..................... | G10L 15/01 |
| 2019/0221213 A1 | 7/2019 | Shah et al. | | |

* cited by examiner

DATA-DRIVEN AND RULE-BASED SPEECH RECOGNITION OUTPUT ENHANCEMENT

BACKGROUND

An automatic speech recognition system may generate a text transcript based on an audio input containing human speech. In some cases, however, these text transcripts may contain information that will impair a human's ability to understand what is being said. For example, if a speaker says the letters "A.S.R.U." (e.g., referencing Automatic Speech Recognition and Understanding), the transcript might instead read "ASR you"). Similarly, the transcripts might contain information will impair a machine's ability to understand and react to what is being said. For example, a speaker might say "I think that was, uh, hmmm, five years ago . . . no six, it was six years ago." Although technically accurate, such a transcript might confuse a downstream task such as machine reading comprehension and/or summarization. As a result, a system's performance may suffer when using such transcripts. What is needed are systems and methods to accurately and efficiently improve automatic speech recognition transcripts.

SUMMARY

This summary is provided to introduce a selection of concepts in a simplified form that are further described below in the detailed description section. This summary is not intended to identify all key or essential features of the claimed subject matter, nor is it intended as an aid in determining the scope of the claimed subject matter.

Systems, methods, and computer readable storage devices embodying instructions for improved automatic speech recognition transcripts are provided herein. In some embodiments, a speech recognition transcript post processing system may include a data-driven, statistical layer associated with a trained automatic speech recognition model that selects an initial transcript. A rule-based layer may receive the initial transcript from the data-driven, statistical layer and execute at least one pre-determined rule to generate a first modified transcript. A machine learning approach layer may receive the first modified transcript from the rule-based layer and perform a neural model inference to create a second modified transcript. A human editor layer may receive the second modified transcript from the machine learning approach layer along with an adjustment from at least one human editor. The adjustment may create, in some embodiments, a final transcript that may be used to fine-tune the data-driven, statistical layer.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

DETAILED DESCRIPTION

The following description is provided to enable any person in the art to make and use the described embodiments. Various modifications, however, will remain readily apparent to those in the art.

Figure 1:
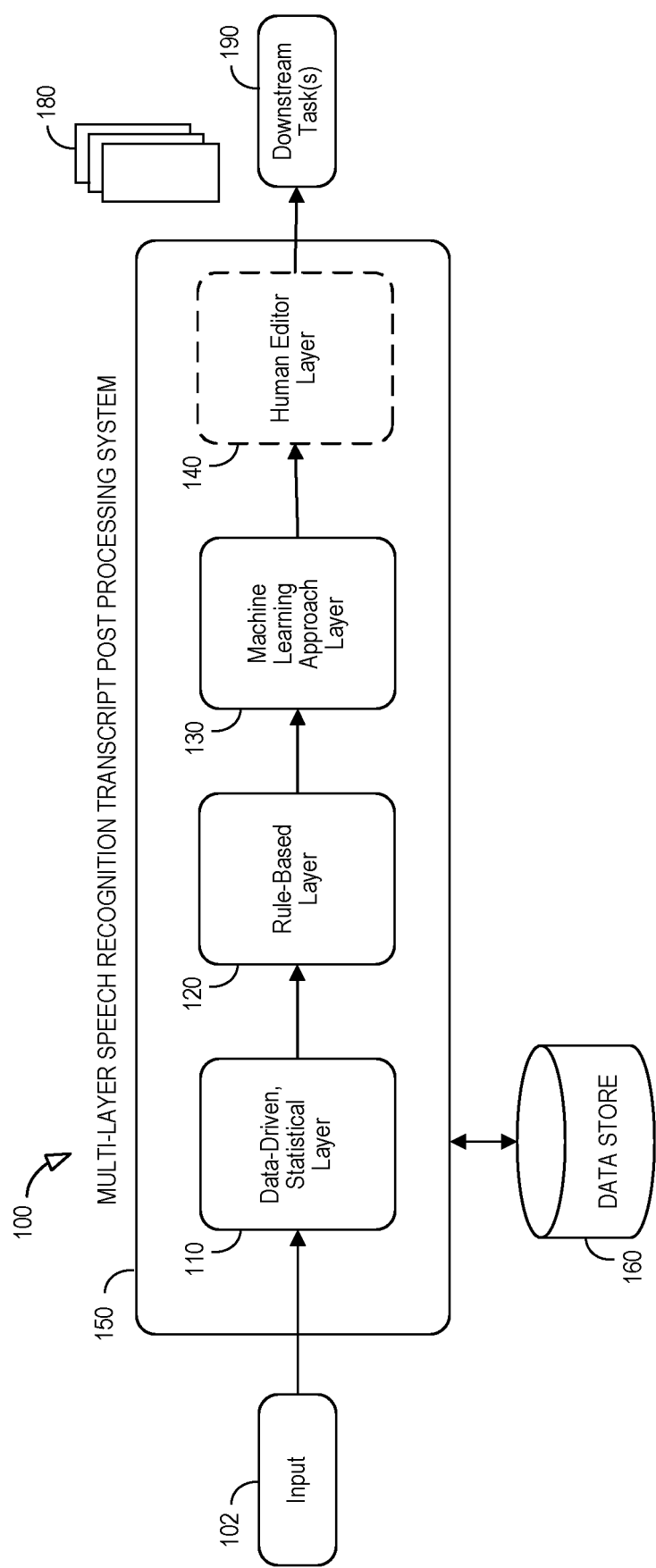
FIG. 1 is a high-level block diagram of a transcript post processing system according to some embodiments.

FIG. 1 is a high-level block diagram of a transcript post processing system 100 according to some embodiments. An input 102 (e.g., one or more text transcripts, audio information, and metadata) is provided to a multi-layer speech recognition transcript post processing system 150. The multi-layer speech recognition transcript post processing system 150 converts the input 102 into a final transcript 180 that is provided to one or more downstream tasks 190 (e.g., question answering or machine translation tasks). The multi-layer speech recognition transcript post processing system 150 may include a data-driven, statistical layer 110, and a rule-based layer 120, and a machine learning approach layer 130. According to some embodiments, an optional a human editor layer 140 may also be incorporated in the system 100 (as illustrated by dashed lines in FIG. 1).

Figure 2:
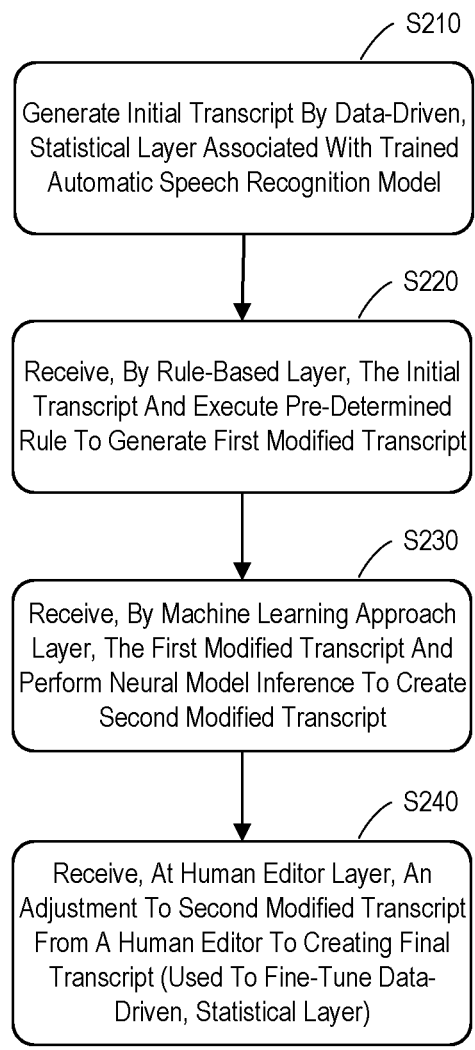
FIG. 2 is a flowchart of a transcript post processing method in accordance with some embodiments.

A detailed process is provided in FIG. 2 which is a flow diagram of a transcript post processing method in accordance with some embodiments. Note that the flowcharts described herein do not imply a fixed order to the steps, and embodiments of the present invention may be practiced in any order that is practicable. Also note that any of the methods described herein may be performed by hardware, software, or any combination of these approaches. For example, a computer-readable storage medium may store thereon instructions that when executed by a machine result in performance according to any of the embodiments described herein.

At S210, a data-driven, statistical layer associated with a trained automatic speech recognition model may select an initial transcript. The data-driven, statistical layer may, for example, select a best initial transcript from a set of N most probable speech recognition transcripts. According to some embodiments, the selection of the best initial transcript is augmented by external attention associated with multiple text documents.

At S220, a rule-based layer may receive the initial transcript and execute at least one pre-determined rule to generate a first modified transcript. The pre-determined rule might be associated with, for example, a white list, a black list, a rule approach, etc. According to some embodiments, the pre-determined rule is automatically generated via offline data mining, data augmentation, and/or model training. The offline data mining might be associated with, for example, supervised classification, unsupervised classification, clustering techniques, n-gram classification, replacement pairs based on context, a graph-based method to link spoken and written sentences based on semantic similarity, search engine data, etc.

At S230, a machine learning approach layer may receive the first modified transcript from the rule-based layer and perform a neural model inference to create a second modified transcript. The machine learning approach layer is might be associated with, for example, online candidate generation, online neural model inference encoding and decoding, and/or online ranking.

At S240, a human editor layer may receive an adjustment to the second modified transcript from at least one human editor. The adjustment may, according to some embodiments, create a final transcript that is used to fine-tune the data-driven, statistical layer. According to some embodiments, the human editor layer is associated with multiple-level human labeling, pairwise human labeling, and/or manual human transcription. The adjustment received at S240 might reflect syntactic correctness (associated with set of rules and processes that govern sentence structure), semantic closeness (associated with the meaning of spoken language), fluency, style, etc. In some embodiments, the system 100 includes a Text-To-Speech ("TTS") conversion followed by a Speech-To-Text ("STT") conversion. The final transcript may then be transmitted to a downstream task (e.g., a task associated with language understanding, machine translation, text summarization, text classification, information extraction, and/or question answering).

Note that the output from an automatic speech recognition system may be statistically optimal given constrains associated with acoustic and language models. The system may aim to minimize the Word Error Rate ("WER") between the transcription and the actual speech. However, there are potential drawbacks to this approach in real applications. For example, statistical models might not capture some commonsense knowledge or prior knowledge. As another example, some tense errors (which are obvious to people) may be difficult for a model to detect/correct. Moreover, WER may not be an appropriate metric for some downstream applications, such as when a transcript reads "Ummm . . . I, I, I think the answer is C." Although this reflects what was actually said, the information might degrade downstream processing, such as processing associated with machine reading comprehension and/or summarization tasks.

According to some embodiments described herein, a readable automatic speech-to-text transcript may be improved through post processing. This may make the transcript more effective for human users in accomplishing specific tasks and/or improve automatic downstream processes that use these transcripts as an input. The post processing might, for example, be associated with large-scale language model rescoring to correct an unlikely word in view of the context of the surrounding speech (which may have a similar pronunciation as compared to the correct word. The post processing might also be associated with Inverse Text Normalization ("ITN") that refines the display format of numbers, entities, cases, punctuations, etc. to more like traditional written sentences. Note, however, that such approaches may not consider syntactic and semantic aspects of speech and might also ignore the disfluencies and/or speaking style of a speaker.

Instead of measuring WER, one could measure the readability of speech recognition and machine translation outputs in terms of reaction time and passage comprehension. Such an approach might consider: (1) participants' accuracy rates at answering questions about the content of the text; (2) the time it takes participants to answer questions; (3) the time it takes participants to read the text and the questions; and/or (4) a subjective score that participants assign to the texts.

In some embodiments, the quality of a transcript may use a subjective scoring method for the original transcript and the post processing results. For example, a 5-level labeling system might comprise scores of:

1. Perfect—the edited text is understandable with correct meaning, without grammar mistakes, disfluencies, or dialects, and all edits are necessary;
2. Excellent—the edited text is understandable with correct meaning, without grammar mistakes, disfluencies, or dialects, but there are some unnecessary edits;
3. Good—the edited text is understandable with correct meaning, but there are some grammar mistakes, disfluencies, or dialects;
4. Fair—the edited text is understandable with correct meaning in general, except some parts; and
5. Bad—the entire edited text is not understandable or has different meaning with the original utterance.

This 5-level system could be simplified to 3 levels (e.g., including Perfect, Good, and Bad) with corresponding guideline adjustment.

Another approach may utilize pairwise ranking of transcript readability. That is, rather than trying to predict the readability of a single transcript, the system may consider pairs of transcripts and predict which one of the two is better. This task may in fact be more natural, since in most applications the main concern is with the relative quality of transcripts (rather than their absolute scores). This approach may also be beneficial in terms of data use, because each pair of transcripts with different average readability scores now becomes a data point for the classification task.

In still another approach, human editors may be asked to directly write down the best edits to the original transcript in terms of human readability. The evaluation may require several reference edits per transcript that are each curated by a different human editor. An extended family of pairwise similarity-based metrics might be used to incorporate consensus between different reference edits for evaluation. Such an approach may provide a natural way to estimate how diversely a group of individuals may phrase the transcript to the same speech. In any approach, the labeling guidelines may let a human editor score the transcript readability based on: (1) syntactic correctness, (2) semantic closeness, (3) fluency, and/or (4) style.

Figure 3A:
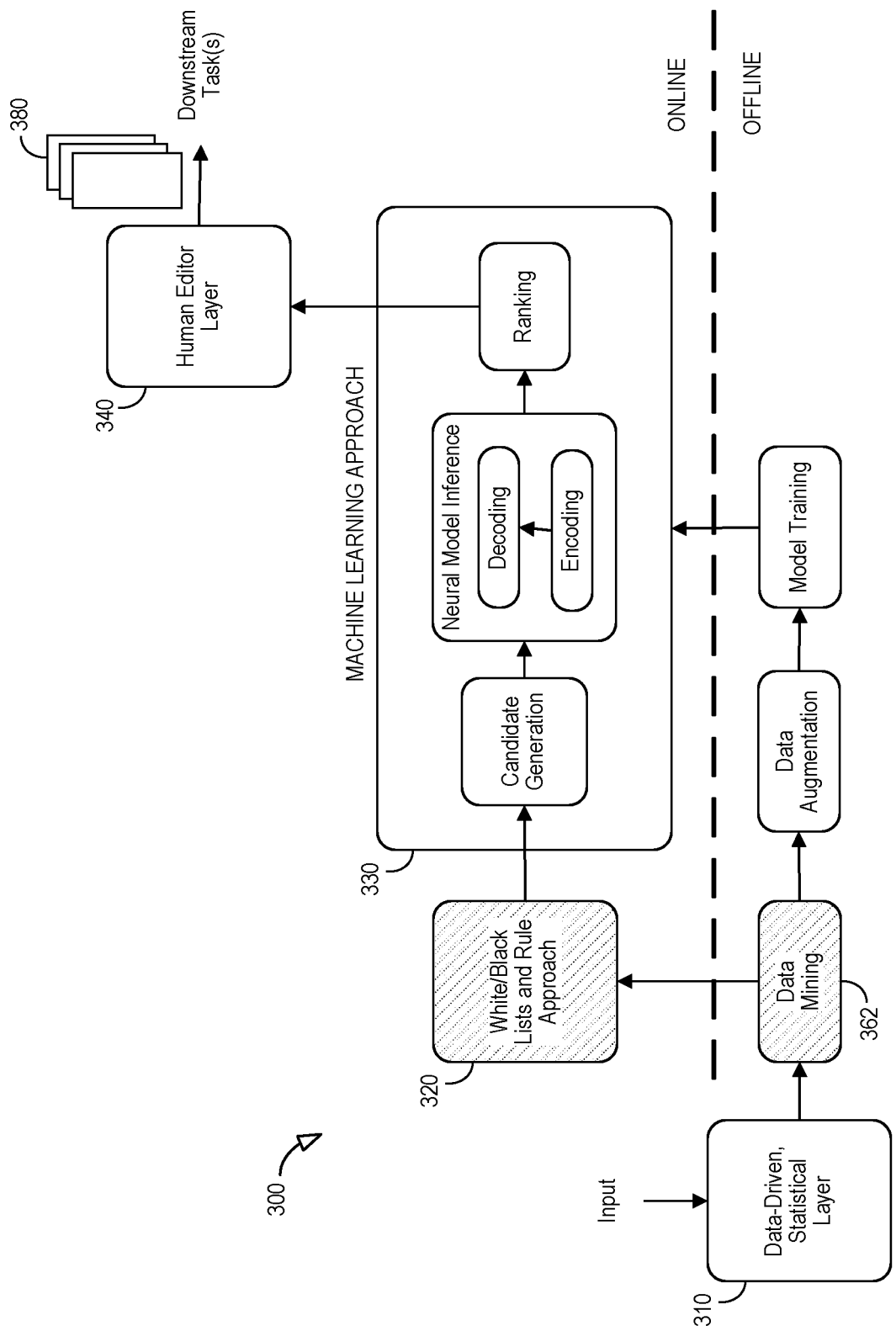
FIG. 3A is a transcript post processing framework according to some embodiments.

FIG. 3A is a transcript post processing framework 300 according to some embodiments. A data-driven, statistical layer 310 receives an input, such as a set of text transcripts representing speech. The framework 300 also includes data mining 362 that receives information from the data-driven, statistical layer 310. According to some embodiments, the data-driven, statistical layer 310 and data mining 620 may be associated with offline processing (along with data augmentation and/or model training processes).

The framework 300 further includes a white/black lists and/or rule approach 320 that receives information from the data mining 362 and provides information to a machine learning approach 330. In some embodiments, the framework 300 includes a human editor layer 340 that receives information from the machine learning approach and output a final transcript 380 that is transmitted to a one or more downstream tasks. According to some embodiments, the white/black lists and/or rule approach 320, machine learning approach 330, and downstream tasks may be associated with online processing.

Note that some errors are repeatedly produced in speech recognition engines. The framework 300 may collect these samples and generate white/black lists and rule approach 320. Every time these words or phrases are generated by a speech recognition engine, the framework 300 may execute white lists (e.g., "ASR you" should be replaced with "ASRU"), black lists ("PMA," "ASR," "WFST," etc.), and/or rules and templates. One simple way to create a rule could be to build a confusion matrix, which contains some easily confused word (or phrase) pairs, and simply replace the word by another word, such as "word" vs. "work." However, the framework 300 may also need to consider which words should be replaced (and which words should not). Part-Of-Speech ("POS") tagging information may be one metric that could be considered. Some existing techniques from search engines (e.g., BING from MICROSOFT®) might also be used for this, such as a speller function, a grammar error correction function, a query suggestion function, etc. These tools could help the framework 300 identify more suitable candidates. Note that some syntactic analysis might also be performed on a sentence basis.

Thus, speech recognition may be followed by downstream tasks, such as language understanding, machine translation, text summarization, text classification, text extraction, search, question answering, etc. Collecting large spoken data corpus for those tasks may be more difficult and time-consuming as compared to plain text content for humans. At the same time, a large amount of text corpora may already exist for those tasks. To measure the impact of transcript readability to those tasks, one approach may be to convert their existing plain text inputs to speech using TTS engines, and then convert the speech back to text transcript using speech recognition engines. A task evaluation may be performed in the normal way.

Table 1 is an example result of using TTS and speech recognition to regenerate Conversational Question and Answer ("CoQA") data. In particular, the voices of two speakers (A and B) were generated by TTS. The speech recognition result reflects ITN. The WER of the transcripts were 11.05% and 10.70%, respectively. The machine comprehension models were fine-tuned from Bidirectional Encoder Representations from Transformers ("BERT") large uncased pretrained model with multi-stage and multi-task training. Three models with different training configurations were selected (Models 1, 2, and 3 in Table 1). Table 1 compares the F1 results between using the original text inputs and generated transcripts of those models:

TABLE 1

| Model | Plain Text | A's Transcripts | B's Transcript |
|---|---|---|---|
| 1 | 87.5 (85.8) | 75.2 (74.9) | 75.8 (75.4) |
| 2 | 87.4 (86.2) | 75.2 (75.1) | 75.8 (75.5) |
| 3 | 87.3 (85.7) | 74.7 (74.4) | 75.1 (75.0) |

The sensitivity of the models to the lack of punctuations was also tested. Note that F1 scores in parenthesis reflect removing the punctuations from the passages. In general, ITN contributed from 2 to 3 points of the F1 result in the last two columns. It is clear that speech recognition introduced a lot of noise (even for high-quality reading style speech) and made a substantial impact to the question answering task. A transcript post processing method might be evaluated in terms of how much this gap can be closed.

Note that speech recognition errors are different from keyboard typing errors. In addition, different speech recognition engines and versions may work differently well on different speech variants. As a result, post processing design may be: (1) specific to speech; (2) general for all engines and versions; and/or (3) specific to one particular engine or version.

The data mining 362 portion of the framework 300 may mine candidates that are most unlikely to appear in written language and their replacements. To align with the design requirements above, the following information might be mined: (1) discrepancies between spoken and written languages; (2) common errors including deletion and insertion patterns of speech recognition engines; and/or (3) specific errors including deletion and insertion patterns of the speech recognition engine being used.

Common and domain knowledges such as entities, pronunciation similarities, human summary about differences between writing and speech, may be collected and/or associated with a word vector representation (e.g., Confusion2Vec) to incorporate both acoustic similarity and context during word representation learning. Words with small distances may represent good confusion pairs in terms of both acoustics and syntactics (or semantics). An output associated with data mining 362 might be used for: (1) a data source of white-/blacklists and rules 320 which do not need to consider context (or when simple contextual rules are sufficient), (2) a data source for candidate generation, and/or (3) prior knowledge for data augmentation associated with encoding.

Figure 3B:
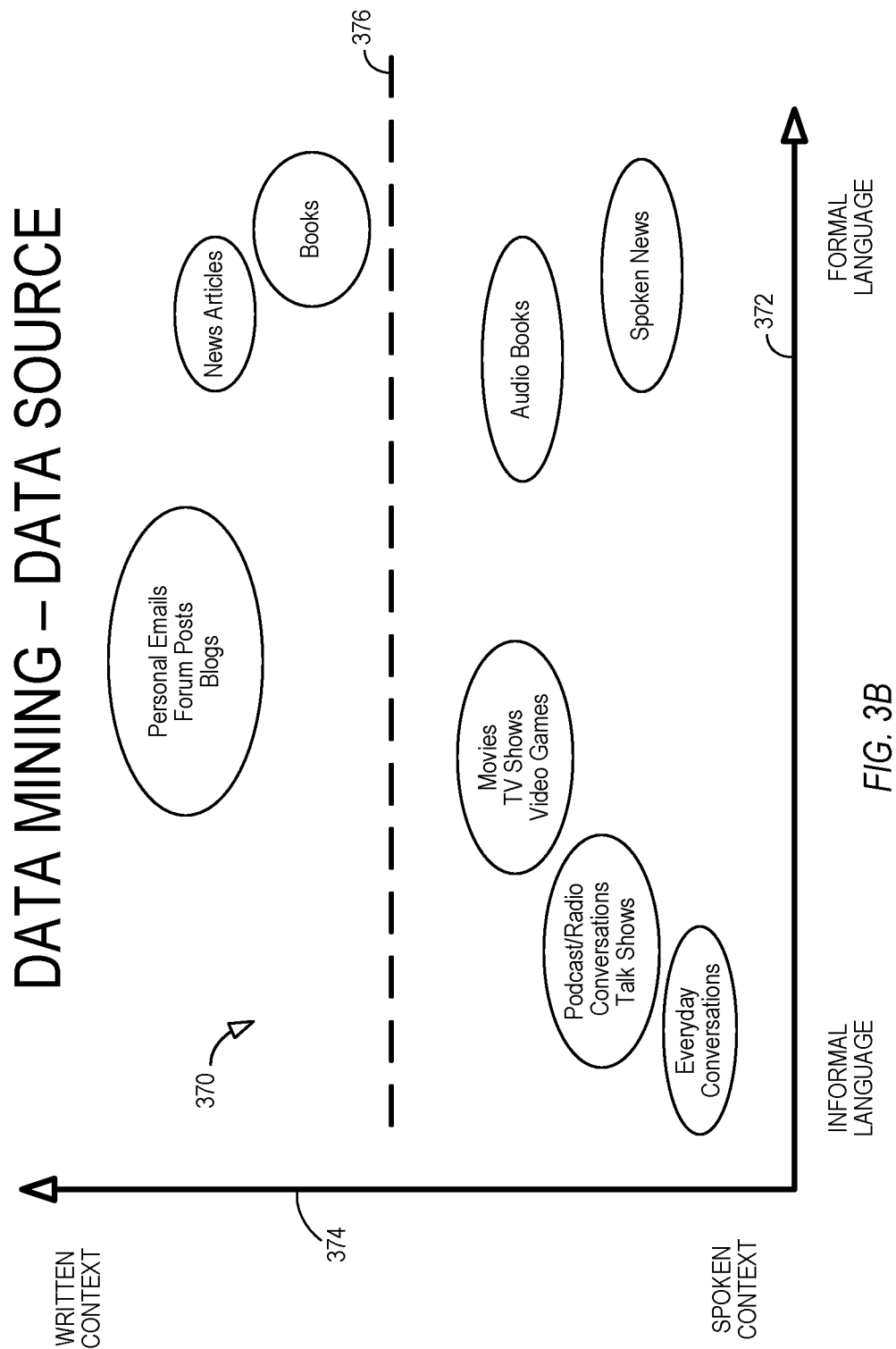
FIG. 3B illustrates various data sources for text mining in accordance with some embodiments.

FIG. 3B illustrates 370 various data sources for text mining in accordance with some embodiments. A first axis 372 of a graph shows sources from informal language environments to more formal language environments. Note that informal language may be associated with conversational speech, improvised speech, simple sentences, etc. Formal language may be associated with official, literary, or academic text, highly edited passages, complex sentence structures, etc. A second axis 374 of the graph shows sources from spoken language environments to more written language context environments (with a dotted line 376 dividing those areas). The data sources may include everyday conversations, podcast/radio conversations and other talk shows, movies, television shows, video games, etc. More formal sources of spoken words might include audio books and spoken news reports. Other data mining sources might include text from books and/or news article, personal emails, forum posts, blog entries, etc.

Figure 3C:
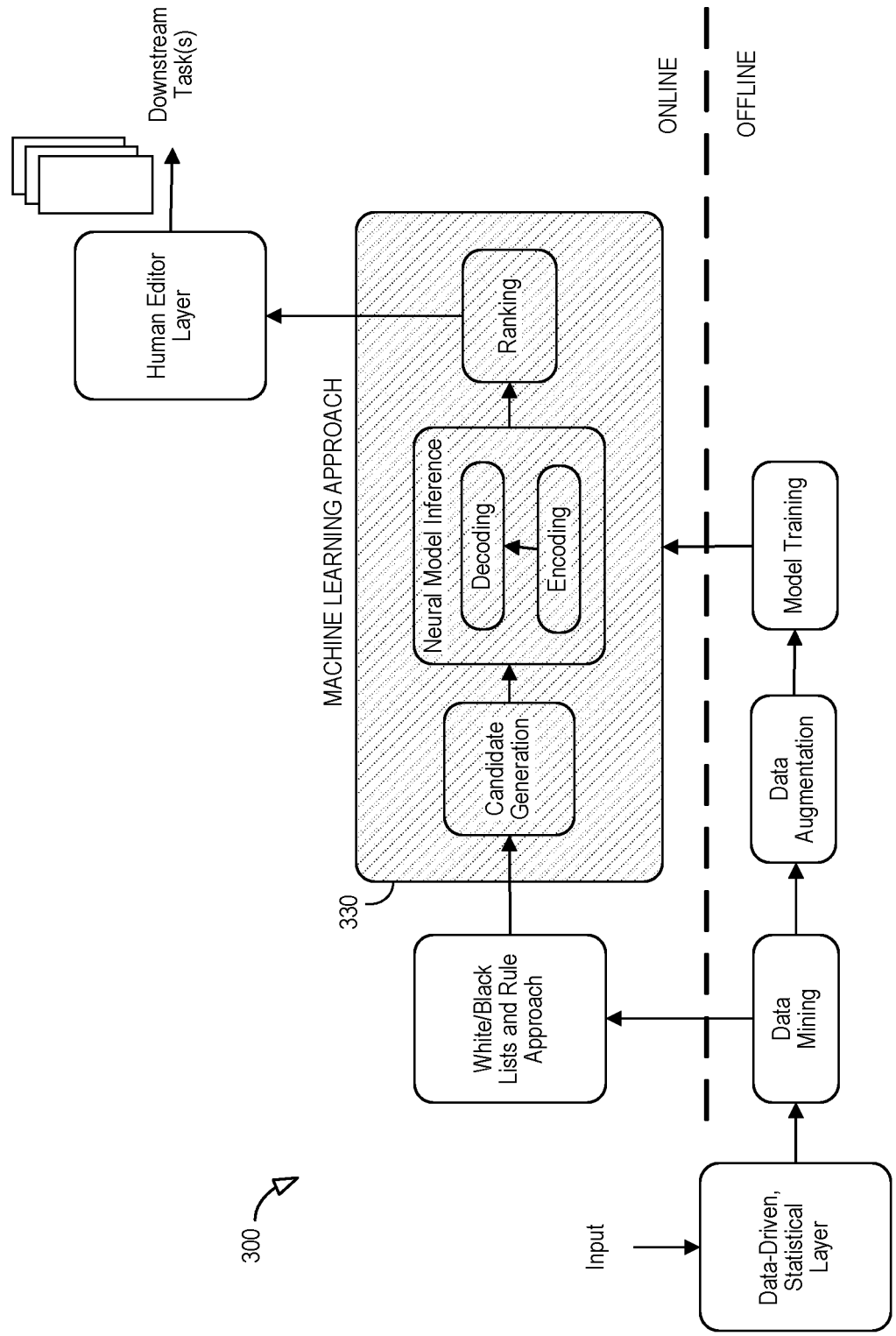
FIGS. 3C through 3H illustrate various elements of the framework according to some embodiments.
Figure 3D:
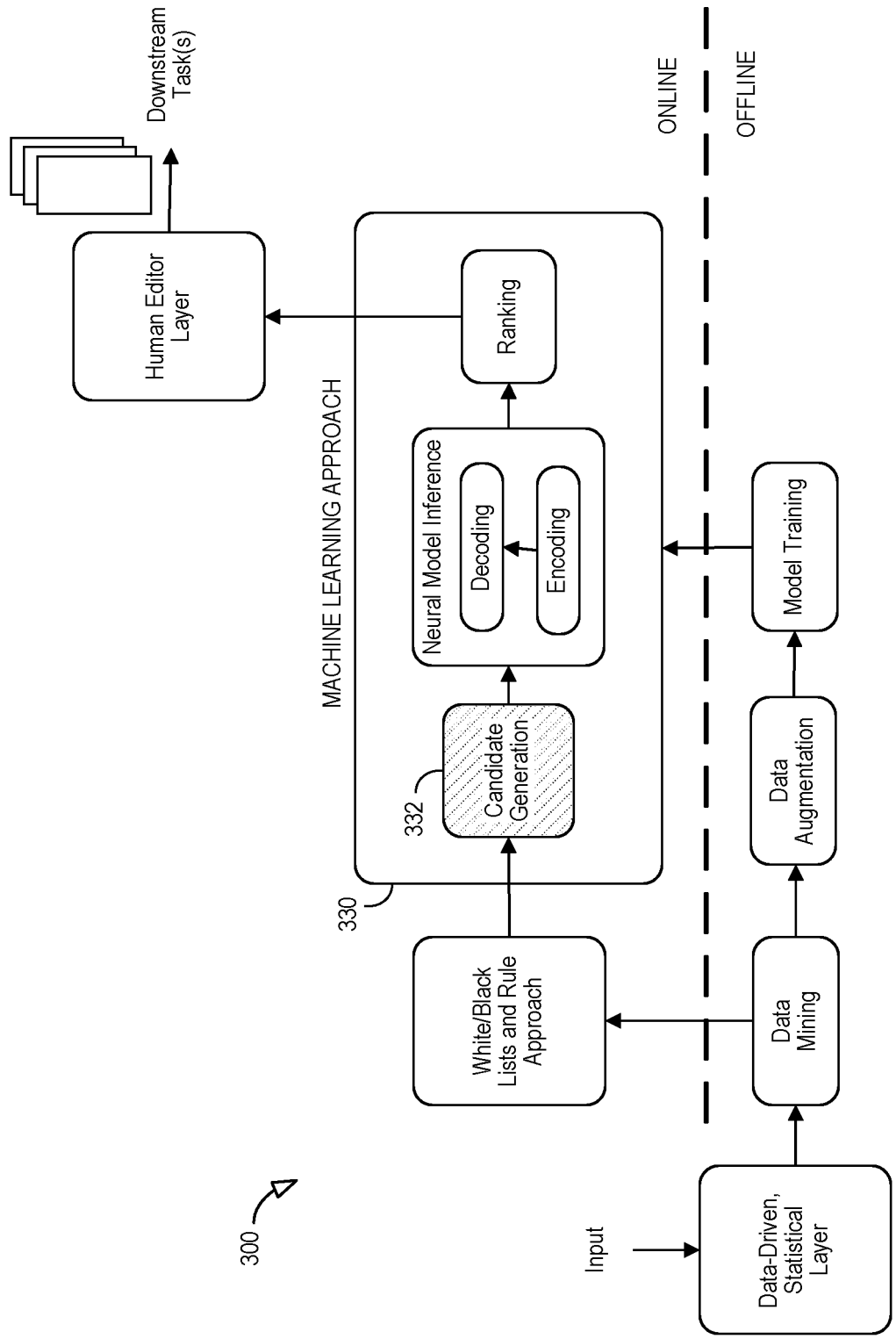

FIG. 3C comprises the framework 300 highlighting the machine learning approach 330 according to some embodiments. In particular, the machine learning approach 330 may include a candidate generation component, a neural model inference (with encoding and decoding portions), and a ranking component, which are described in more detail below. For example, FIG. 3D comprises the framework 300 highlighting candidate generation 332 in accordance with some embodiments. Starting from the n-best of original transcripts, candidates of readable transcripts can be generated based on possible local edits. Local edits might be from two sources, data mining and current speech and the original word-for-word transcript. Specifically, The framework 300 might consider disfluencies to remove from current utterance, including repetitions, incomplete sentences, corrections, interruptions, etc. Similarly, the framework 300 might examine lexical, syntactic, and grammatical errors in the current utterance (not smooth or incoherent segments). Unsaid or indirectly implied parts in the current utterance might also be identified (along with special symbols used as replacements) along with probability of mined candidates during data mining (given the current inputs and the context). Note that data mining may focus on aggregated statistics over an entire corpus while in candidate generation a single utterance is the target. The output of all combinations of possible local edits and their probabilities may be used in decoding as the search space.

Figure 3E:
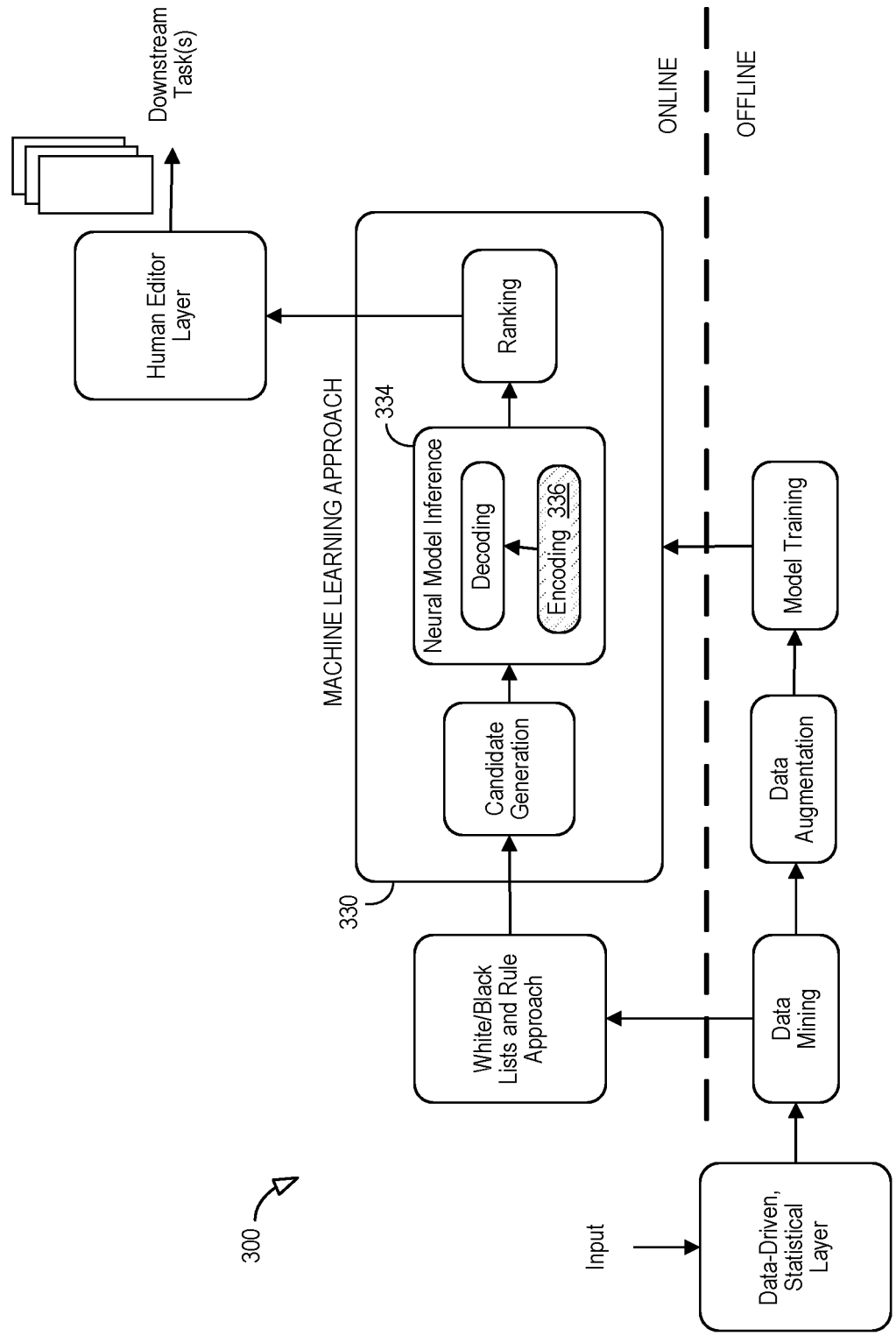

FIG. 3E comprises the framework 300 highlighting an encoding process 336 for a neural model inference 334 according to some embodiments. The encoding process 336 may, for example, fuse real and augmented data. That is, the encoding 336 might receive real data, TTS and STT augmented data for specific speech recognition errors, synthesized data based on the prior knowledge from data mining, purely randomly generated data for generalization ability, etc. (with the ration between those sources being selected as appropriate). Note that the purely plain text-based methods aim to introduce the differences between spoken and written languages as well as speech recognition errors. Data mined from data mining can be used as the prior distributions of the ratio, position, and words for the change, but a portion of data should be randomly generated without the prior for well generalization in the future. The TTS based method may be expected to generate more specific recognition errors for certain speech recognition models. Note that disfluency is not the target of the TTS based method.

Figure 3F:
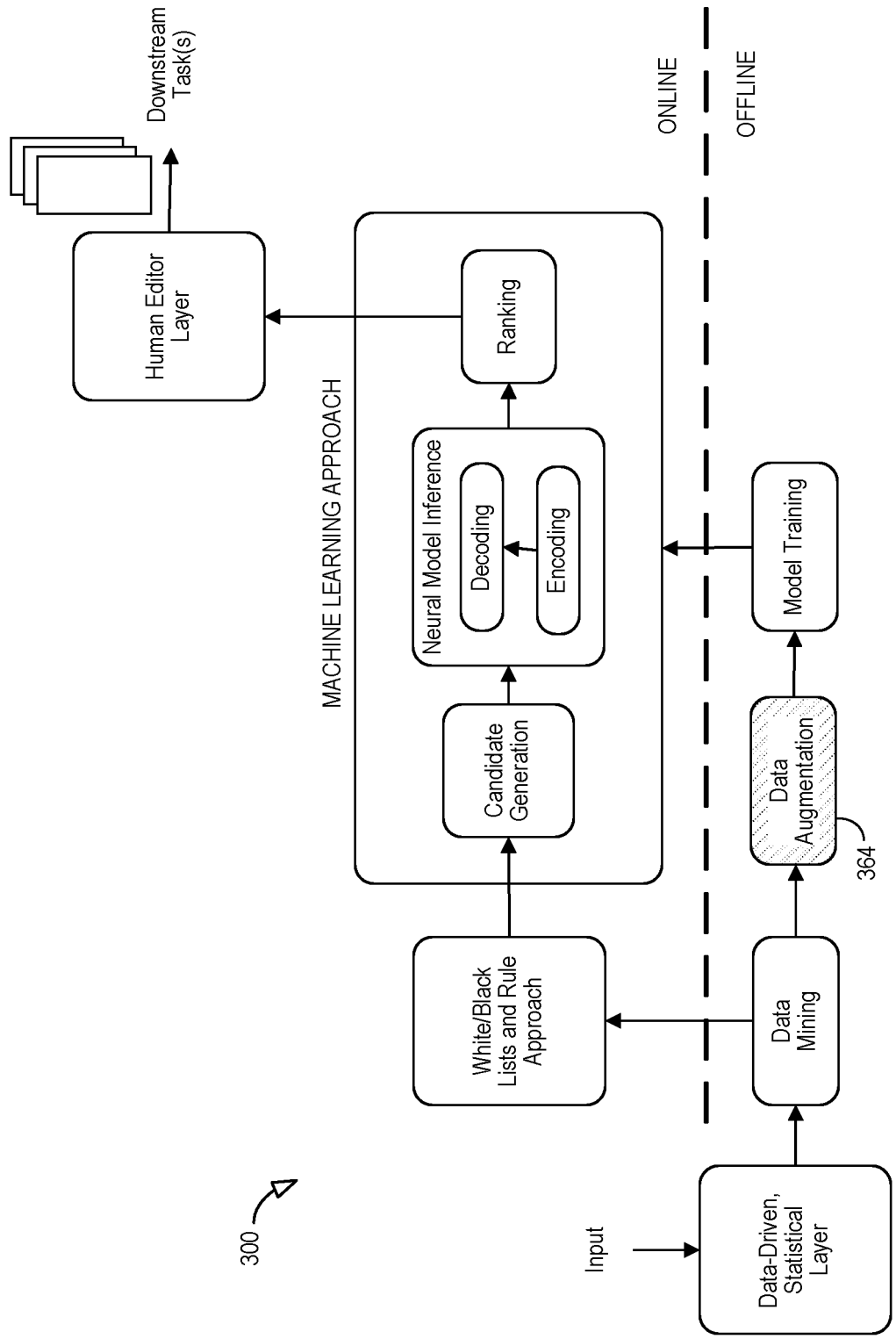

FIG. 3F comprises the framework 300 highlighting data augmentation 364 in accordance with some embodiments. In particular, the data augmentation 364 may provide information to model training (that, in turn, provides data used by the machine learning approach). Recent progress in language modeling has been associated with substantial amounts of automatically labeled training data (which is used to model general linguistic ability). While written language representation has been largely improved, spoken language representation has been less fully explored. One of the reasons for this might be the lack of pairwise data between spoken and written languages. Embodiments described herein might be associated with discovering large amount of unlabeled spoken language corpora and conversation transcripts. Embodiments may also be associated with designing training targets that can be generated automatically and designing neural network architecture to predict appropriate targets. The framework 300 may also synthesize the spoken language from written language such as by:
- random text normalization converting numbers and abbreviations;
- randomly adding disfluencies;
- randomly converting uppercase to lowercase;
- randomly changing punctuations;
- adding grammar errors (e.g., randomly add/remove/change a portion of words or regenerate the text using TTS and STT).

Figure 3G:
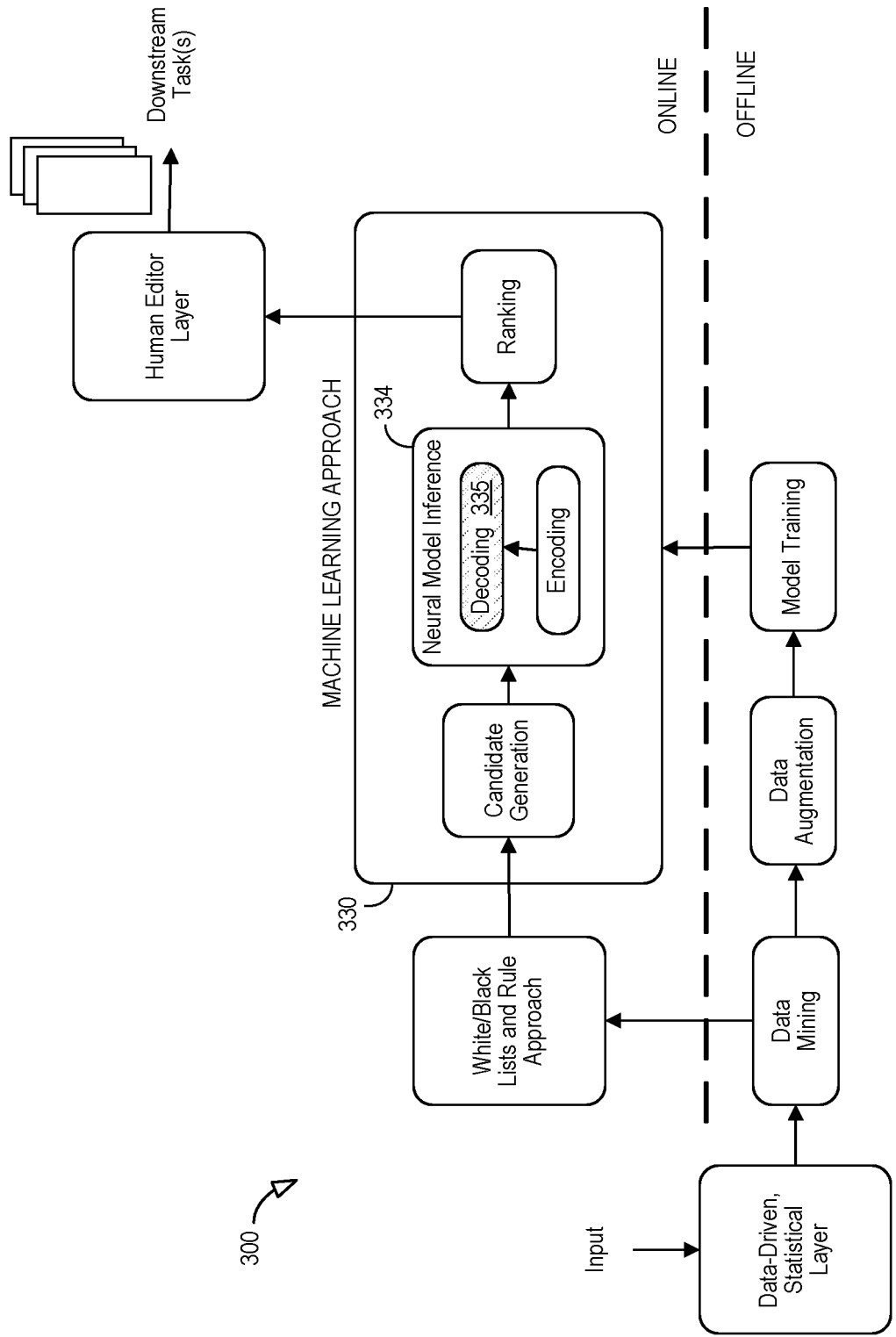

FIG. 3G comprises the framework 300 highlighting a decoding process 334 for the neural model inference 334 according to some embodiments. Note that decoding may be performed within the search space described in candidate generation. In addition, several types of inputs might be required during the decoding: (1) encoder output as the representation of original transcript to capture the semantic meaning; (2) large scale pretrained unidirectional and/or bidirectional written language generation models; (3) acoustic representations to capture the pronunciation, semantic meaning, and emotional context such as tone, volume, timbre, etc. Note that context representations may capture who was speaking when and where (as well as the topics and domains). Sometimes knowledge representations may capture common sense knowledges. Moreover, attention among different types of information can help alignment (and a copy mechanism during decoding may be important to prevent unnecessary changes).

Figure 3H:
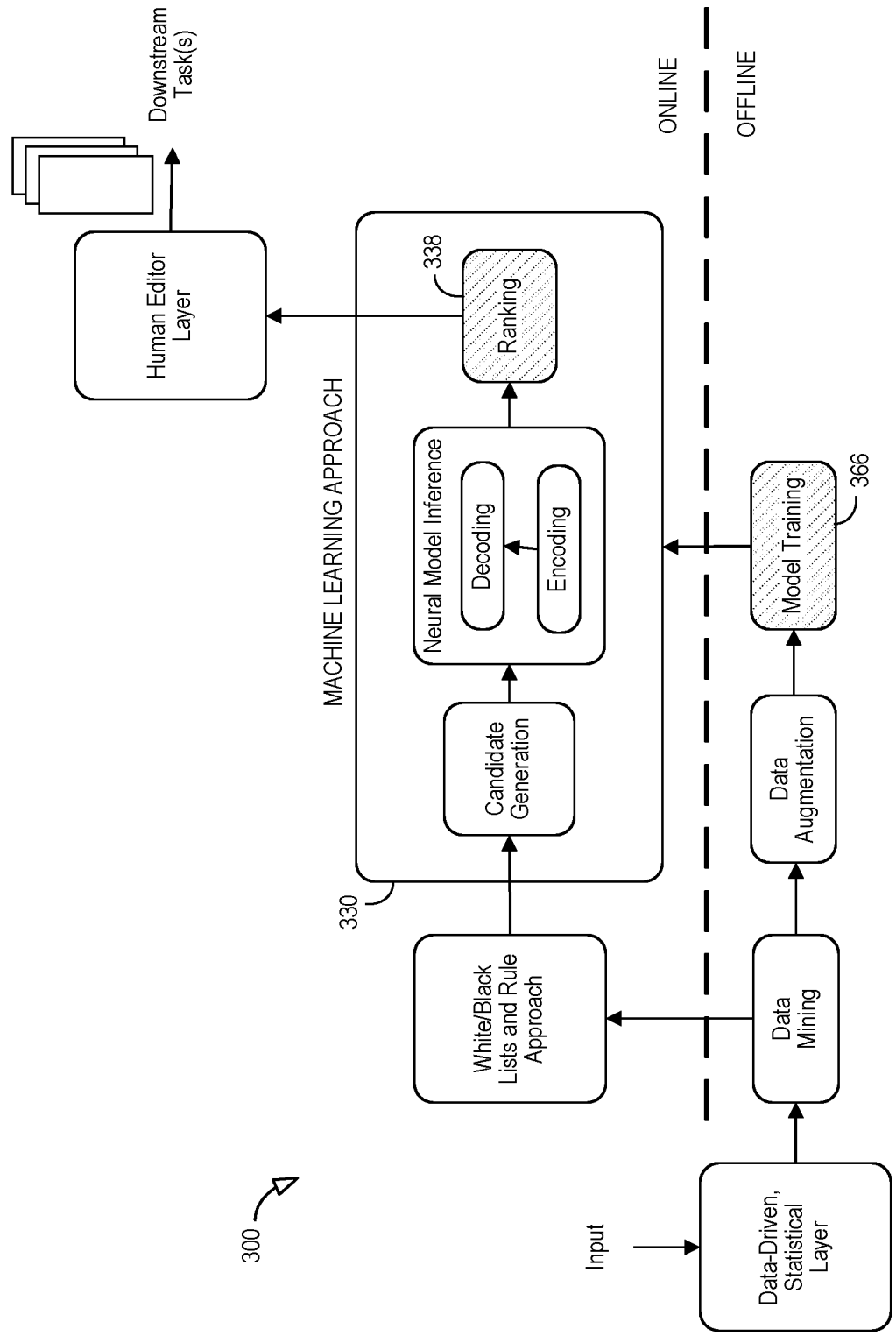

FIG. 3H comprises the framework 300 highlighting model training 366 and ranking 338 according to some embodiments. To train 366 the encoder and decoder, pairwise data between an original word-for-word transcript and an expected readable transcript may be required. If the framework 300 considers other information such as acoustics, data acquisition may become more difficult as human labeling is both expensive and time consuming. As a result, pre-training of the spoken language encoder as well as the encoders of other data types may be important important. This might be performed individually for each data type. Finally, the pretrained encoders and decoder may be fine-tuned together on real labeled transcript post processing data. According to some embodiments, the ranking 338 may re-rank decoding outputs because some metrics can be introduced more easily as compared to the decoding step. These may include, but are not limited to:
- an overall readability of current output;
- overall semantic/pronunciation/edit similarities between current input and output;
- smoothness and coherence of the context that contains current output; and
- style consistency of the whole transcript.

While some implementations will be described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
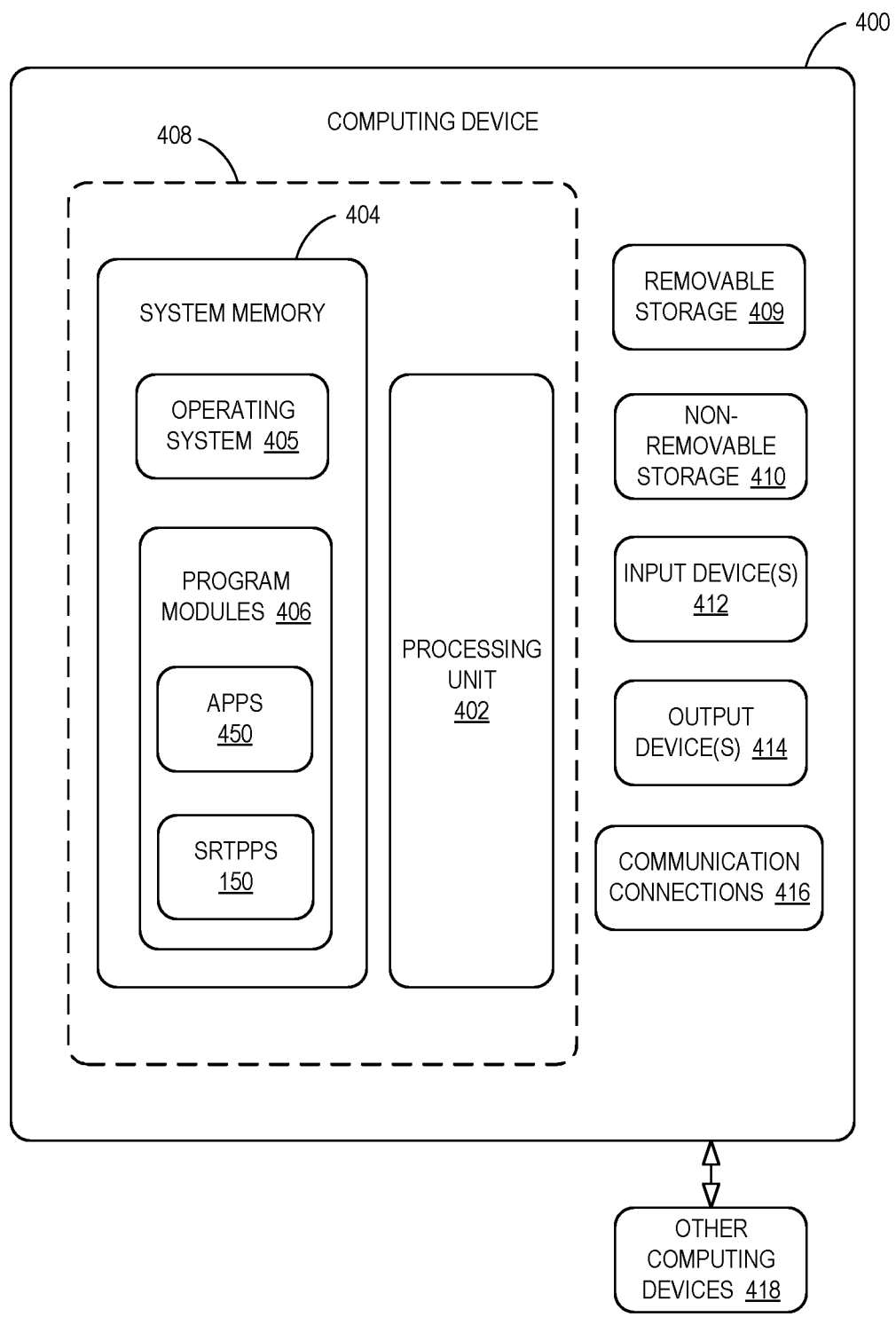
FIG. 4 is a block diagram illustrating example physical components of a computing device in accordance with some embodiments.
Figure 5A:
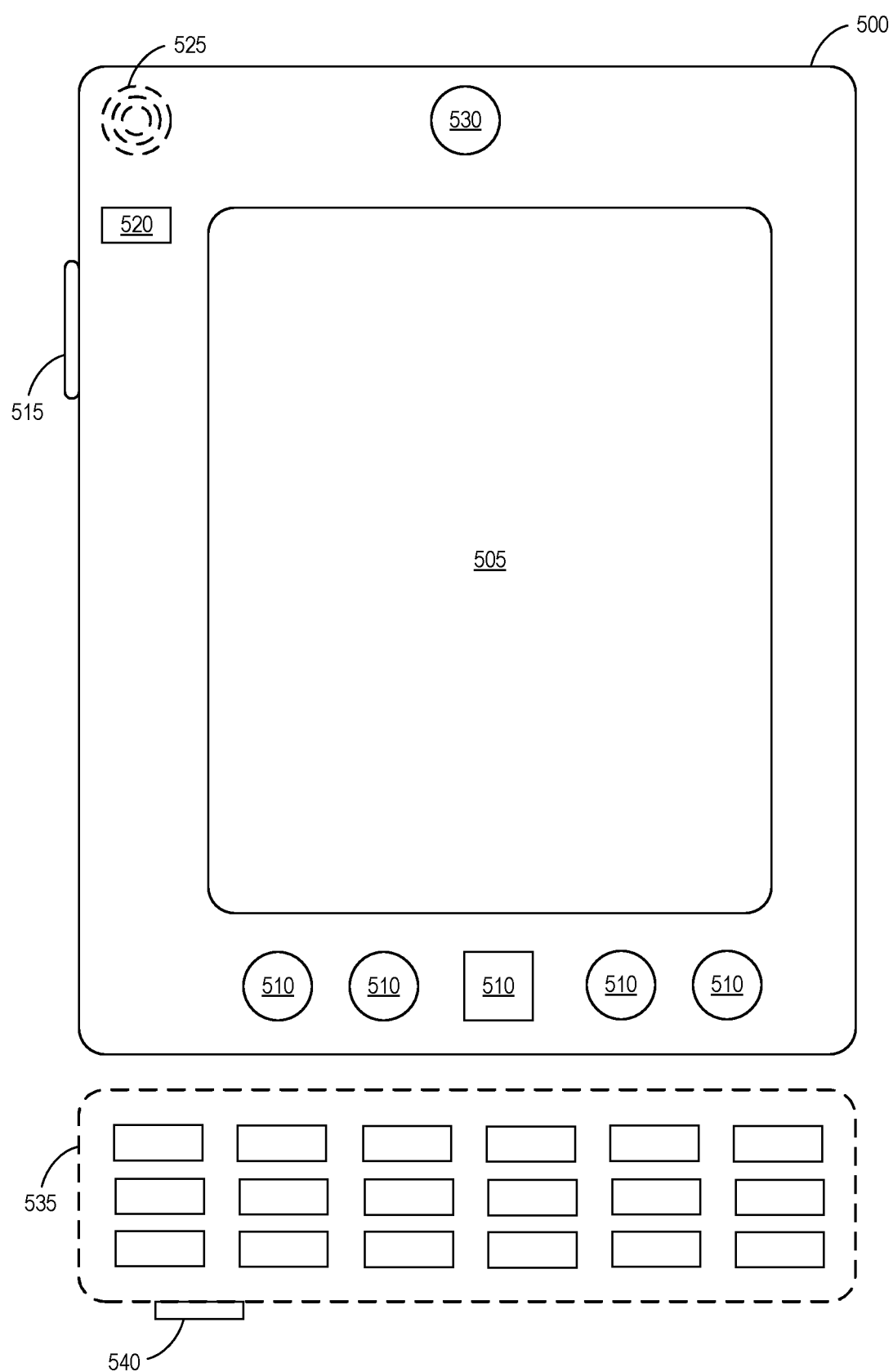
FIGS. 5A and 5B are block diagrams of a mobile computing device according to some embodiments.
Figure 5B:
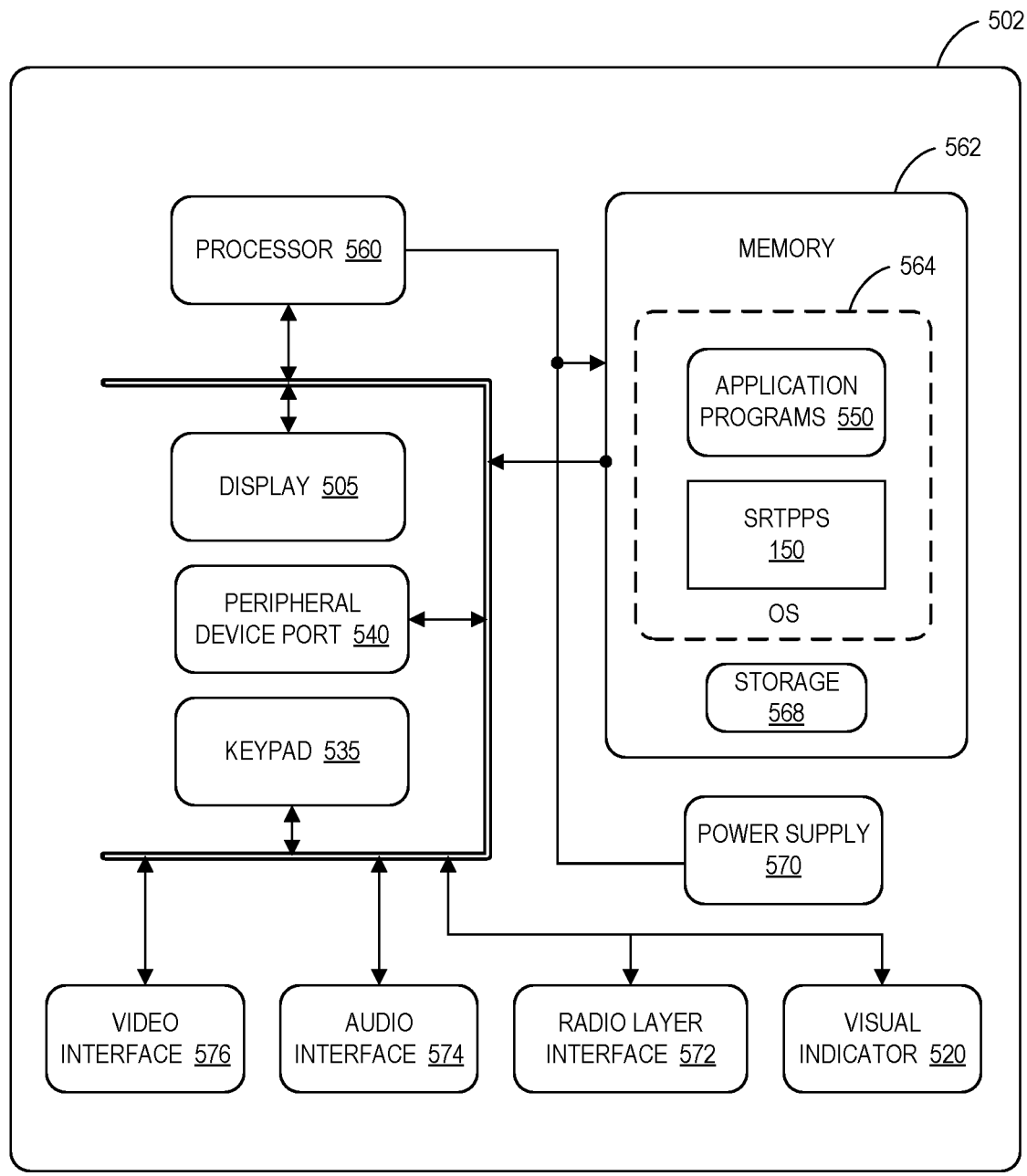
Figure 6:
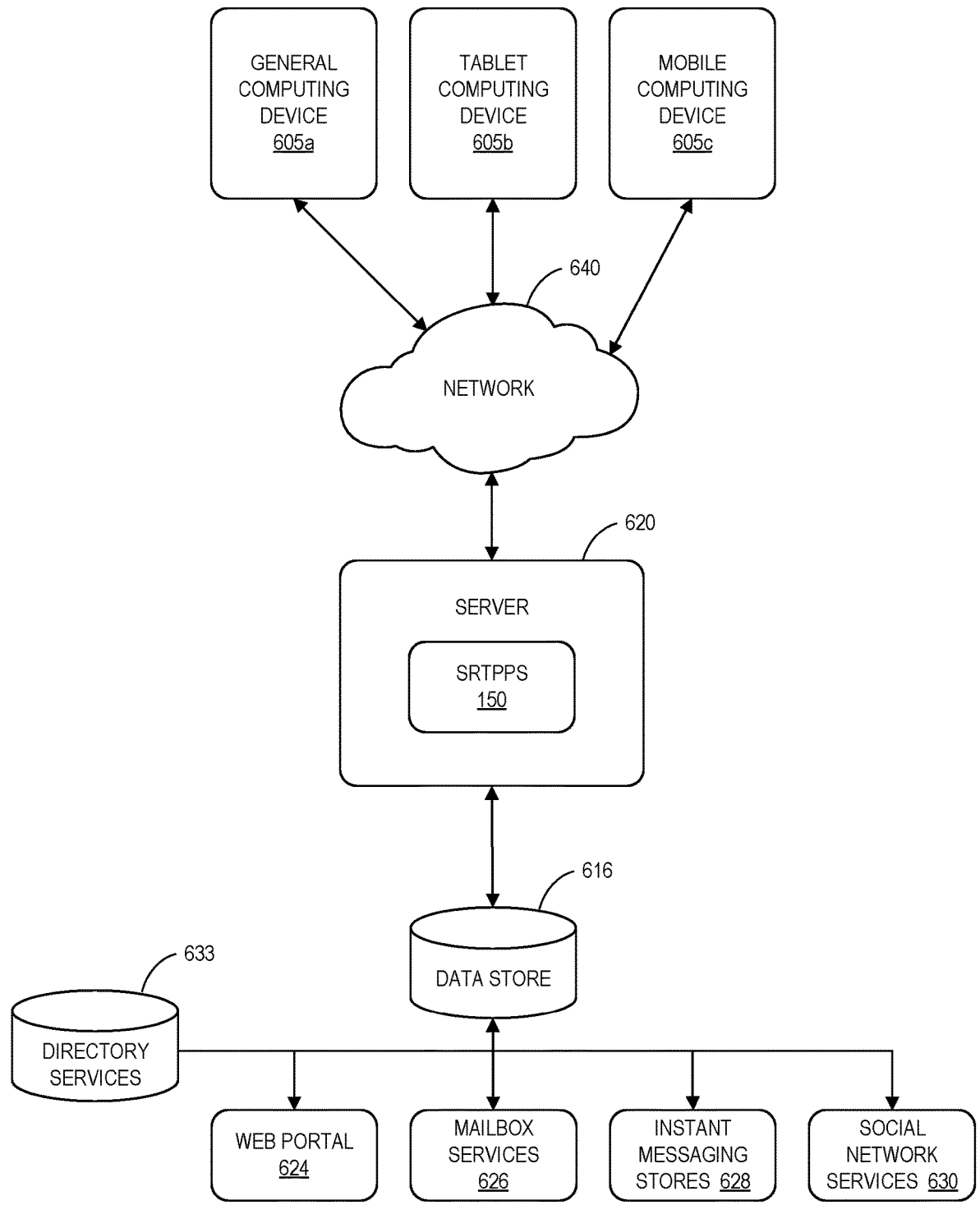
FIG. 6 is a block diagram of a distributed computing system in accordance with some embodiments

FIGS. 4 through 6 and the associated descriptions provide a discussion of a variety of operating environments in which examples are practiced. However, the devices and systems illustrated and discussed with respect to FIGS. 4 through 6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the multi-level Speech Recognition Transcript Post Processing ("SRTPPS") 150 in accordance with any of the embodiments described herein. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., MT platform 120 in accordance with any of the embodiments described herein) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, Radio Frequency ("RF") transmitter, receiver, and/or transceiver circuitry; Universal Serial Bus ("USB"), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, Electrically Erasable Programmable Read-Only Memory ("EEPROM"), flash memory or other memory technology, CD-ROM, Digital Versatile Disks ("DVD") or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, RF, infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a Graphical User Interface ("GUI"), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., an HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., an HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated Personal Digital Assistant ("PDA") and wireless phone.

According to an aspect, one or more application programs 550 are loaded into the memory 562 and run on or in association with the operating system 564. Examples of the application programs include phone dialer programs, e-mail programs, Personal Information Management ("PIM") programs, word processing programs, spreadsheet programs, Internet browser programs, messaging programs, and so forth. According to an aspect, SRTPPS 150 in accordance with any of the embodiments described herein and/or one or more speech recognition models may be loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a Light Emitting Diode ("LED") and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic speech recognition as described above. Content developed, interacted with, or edited in association with the SRTPPS 150 in accordance with any of the embodiments described herein is enabled to be stored in different communication channels or other storage types. For example, various documents may be stored using a directory service 622, a web portal 624, a mailbox service 626, an instant messaging store 628, or a social networking site 630. The SRTPPS 150 in accordance with any of the embodiments described herein is operative to use any of these types of systems or the like to perform Automatic Speech Recognition ("ASR"). According to an aspect, a server 620 provides the SRTPPS 150 in accordance with any of the embodiments described herein to clients 605a, 605b, 605c. As one example, the server 620 is a web server providing the SRTPPS 150 in accordance with any of the embodiments described herein over the web. The server 620 provides the SRTPPS 150 in accordance with any of the embodiments described herein over the web to clients 605 through a network 640. By way of example, the client computing device is implemented and embodied in a personal computer 605a, a tablet computing device 605b, or a mobile computing device 605c (e.g., a smart phone), or other computing device. Any of these examples of the client computing device are operable to obtain content from the store 616.

Figure 7:
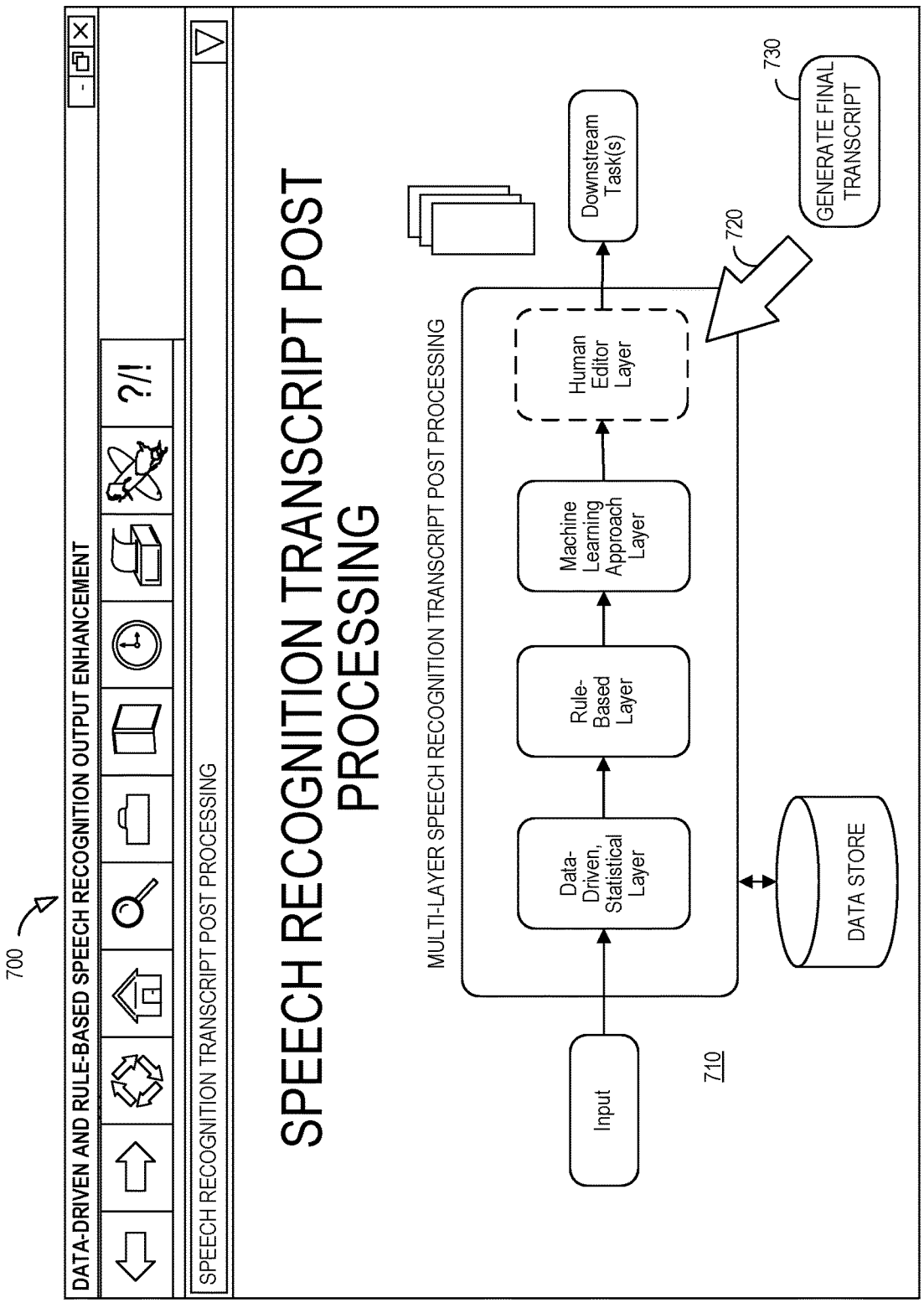
FIG. 7 is an operator or administrator speech recognition transcript post processing display associated with transcript post processing in accordance with some embodiments.

An operator or administrator may view and/or adjust parameters associated with a SRTPPS in accordance with any of the embodiments described herein. For example, FIG. 7 is speech recognition transcript post processing display 700 in accordance with some embodiments. The display 700 includes graphical elements 710 representing a four-layer transcript post processing system in accordance with embodiments described herein. Selection of various elements 710 (e.g., via a touchscreen or computer mouse pointer 720) may result in a display of additional details about that element 710 (e.g., via a pop-up window) and/or provide the operator or administrator with a chance to alter or adjust properties of that element 710. For example, the operator or administrator might adjust model parameters, training set data, white or black lists, etc.

Some implementations are described herein with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Thus, embodiments may provide systems and methods to accurately and efficiently improve automatic speech recognition transcripts. In some embodiments, a four-layer approach improves speech recognition output reaching 100% accuracy. The first layer may comprise a data-driven system that combines the N-best list (N most probable outputs) into 1-best, closely matching the reference. This layer may, in some embodiments, be augmented by a text corpus (e.g., "external attention") which consists of multiple text documents. The second and third layer may be rule-based where the output of previous layers is fine-tuned. Finally, the last layer may be based on human input. According to some embodiments, the result can then be used as reference for the data-driven layer closing the loop.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A multi-layer speech recognition transcript post processing system, comprising:
    a data-driven, statistical layer associated with a trained automatic speech recognition model that selects an initial transcript;
    a rule-based layer that receives the initial transcript from the data-driven, statistical layer and executes at least one pre-determined rule to generate a first modified transcript;
    a machine learning approach layer that receives the first modified transcript from the rule-based layer and performs a neural model inference to create a second modified transcript; and
    a human editor layer that receives the second modified transcript from the machine learning approach layer and uses an adjustment received from at least one human editor to output a final transcript, wherein the final transcript is used to fine-tune the data-driven, statistical layer.

2. The system of claim 1, wherein the data-driven, statistical layer selects a best initial transcript from a set of N most probable speech recognition transcripts.

3. The system of claim 2, wherein the selection of the best initial transcript is augmented by external attention comprising multiple text documents.

4. The system of claim 1, wherein the pre-determined rule is associated with at least one of: (i) a white list, (ii) a black list, and (iii) a rule approach.

5. The system of claim 4, wherein the pre-determined rule is automatically generated via offline data mining, data augmentation, and model training.

6. The system of claim 5, wherein the offline data mining is associated with at least one of: (i) supervised classification, (ii) unsupervised classification, (iii) clustering techniques, (iv) n-gram classification, (v) replacement pairs based on context, (vi) a graph-based method to link spoken and written sentences based on semantic similarity, and (vii) search engine data.

7. The system of claim 1, wherein the machine learning approach layer is associated with at least one of: (i) online candidate generation, (ii) online neural model inference encoding and decoding, and (iii) online ranking.

8. The system of claim 1, wherein the human editor layer is associated with at least one of: (i) multiple-level human labeling, (ii) pairwise human labeling, and (iii) manual human transcription.

9. The system of claim 8, wherein the adjustment is associated with at least one of: (i) syntactic correctness, (ii) semantic closeness, (iii) fluency, and (iv) style.

10. The system of claim 1, wherein the human editor layer includes a text-to-speech conversion followed by a speech-to-text conversion.

11. The system of claim 1, wherein the final transcript is transmitted to a downstream task associated with at least one of: (i) language understanding, (ii) machine translation, (iii) text summarization, (iv) text classification, (v) information extraction, and (vi) question answering.

12. A computer-implemented method for a multi-layer speech recognition transcript post processing system, comprising:
    selecting, by a data-driven, statistical layer associated with a trained automatic speech recognition model, an initial transcript;
    receiving, by a rule-based layer, the initial transcript and executing at least one pre-determined rule to generate a first modified transcript;
    receiving, by a machine learning approach layer, the first modified transcript from the rule-based layer and performing a neural model inference to create a second modified transcript; and
    receiving, at a human editor layer, an adjustment to the second modified transcript from at least one human editor that is used to output a final transcript that wherein the final transcript is used to fine-tune the data-driven, statistical layer.

13. The method of claim 12, wherein the human editor layer is associated with at least one of: (i) multiple-level human labeling, (ii) pairwise human labeling, and (iii) manual human transcription.

14. The method of claim 13, wherein the adjustment is associated with at least one of: (i) syntactic correctness, (ii) semantic closeness, (iii) fluency, and (iv) style.

15. The method of claim 12, wherein the final transcript is transmitted to a downstream task associated with at least one of: (i) language understanding, (ii) machine translation, (iii) text summarization, (iv) text classification, (v) information extraction, and (vi) question answering.

16. A non-transient, computer-readable medium storing instructions to be executed by a processor to perform a method for a multi-layer speech recognition transcript post processing system, the method comprising:

selecting, by a data-driven, statistical layer associated with a trained automatic speech recognition model, an initial transcript;

receiving, by a rule-based layer, the initial transcript and executing at least one pre-determined rule to generate a first modified transcript;

receiving, by a machine learning approach layer, the first modified transcript from the rule-based layer and performing a neural model inference to create a second modified transcript and receiving, at a human editor layer, an adjustment to the second modified transcript from at least one human editor that is used to output a final transcript, wherein the final transcript is used to fine-tune the data-driven, statistical layer.

17. The medium of claim 16, wherein the data-driven, statistical layer selects a best initial transcript from a set of N most probable speech recognition transcripts.

18. The medium of claim 16, wherein the pre-determined rule is associated with at least one of: (i) a white list, (ii) a black list, and (iii) a rule approach.

19. The medium of claim 16, wherein the machine learning approach layer is associated with at least one of: (i) online candidate generation, (ii) online neural model inference encoding and decoding, and (iii) online ranking.

* * * * *